US 6,735,383 B2

(12) United States Patent
Imada (10) Patent No.: US 6,735,383 B2
(45) Date of Patent: May 11, 2004

(54) VIBRATION CORRECTION APPARATUS, LENS APPARATUS, AND OPTICAL APPARATUS (75) Inventor: Shinji Imada, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/047,109

(22) Filed: Jan. 17, 2002

(65) Prior Publication Data
US 2002/0097993 A1 Jul. 25, 2002

(30) Foreign Application Priority Data
Jan. 23, 2001 (JP) ....................................... 2001-014373

(51) Int. Cl.[7] ............................................. G03B 17/00
(52) U.S. Cl. ..................................... 396/55; 348/208.99
(58) Field of Search ................... 396/52–55; 348/208.99

(56) References Cited

U.S. PATENT DOCUMENTS

| 5,615,397 A | 3/1997 | Shiomi et al. ............... 396/55 |
| 5,771,403 A | 6/1998 | Imada ......................... 396/52 |
| 5,881,324 A | 3/1999 | Imada ......................... 396/42 |
| 6,070,015 A * | 5/2000 | Shiomi ........................ 396/55 |
| 6,208,810 B1 | 3/2001 | Imada ......................... 396/55 |

* cited by examiner

Primary Examiner—Russell Adams
Assistant Examiner—Arthur A Smith
(74) Attorney, Agent, or Firm—Fitzpatrick, Cella, Harper & Scinto (57) ABSTRACT An optical apparatus is disclosed, which includes a vibration detection unit which detects vibrations, a signal processing unit which performs signal processing for the vibration detection signal output from the vibration detection unit, a vibration correction unit which corrects an image movement caused by the vibration, on the basis of the drive signal output from the signal processing unit, and a controller which controls the drive of the vibration correction unit. The controller corrects the drive signal from the signal processing unit by using a predetermined correction value corresponding to the driven state of the vibration correction unit, and controls drive of the vibration correction unit by using the corrected drive signal.

33 Claims, 5 Drawing Sheets

VIBRATION CORRECTION APPARATUS, LENS APPARATUS, AND OPTICAL APPARATUS

BACKGROUND OF THE INVENTION

1. Field of the Invention

The present invention relates to a vibration correction apparatus, a lens apparatus using the vibration correction apparatus, and an optical apparatus using the lens apparatus.

2. Related Background Art

In current cameras, all important operations for photography, e.g., exposure determination and focusing, are automated. For this reason, even unskilled photographers rarely make photographic errors.

In addition, recently, systems for preventing hand vibrations from being applied to cameras have been studied, thus almost eliminating factors that cause photographers to make photographic errors.

A system for preventing hand vibrations will be briefly described below.

In general, hand vibrations applied to a camera at the time of photography have a frequency of 1 to 12 Hz. According to the basic idea for taking a picture without image blur even with such hand vibrations at the time of shutter release, the vibrations of the camera due to the above hand vibrations must be detected, and the correction lens must be displaced in accordance with the detection value. In order to allow a photographer to take a picture without image blur even with vibrations produced in the camera, the vibrations of the camera must be accurately detected first, and then optical axis displacement due to hand vibrations must be corrected.

Detection of such vibrations (camera vibrations), according to its principle, can be performed by equipping the camera with a vibration sensor for detecting an angular acceleration, angular velocity, angular displacement, or the like and a vibration detection means for electrically or mechanically integrating output signals from the vibration sensor to output an angular displacement. A correction optical apparatus for decentering the photography optical axis is driven on the basis of this detection information, thereby suppressing vibrations.

A system having a vibration correction function will be briefly described below with reference to FIG. 5.

Figure 5:
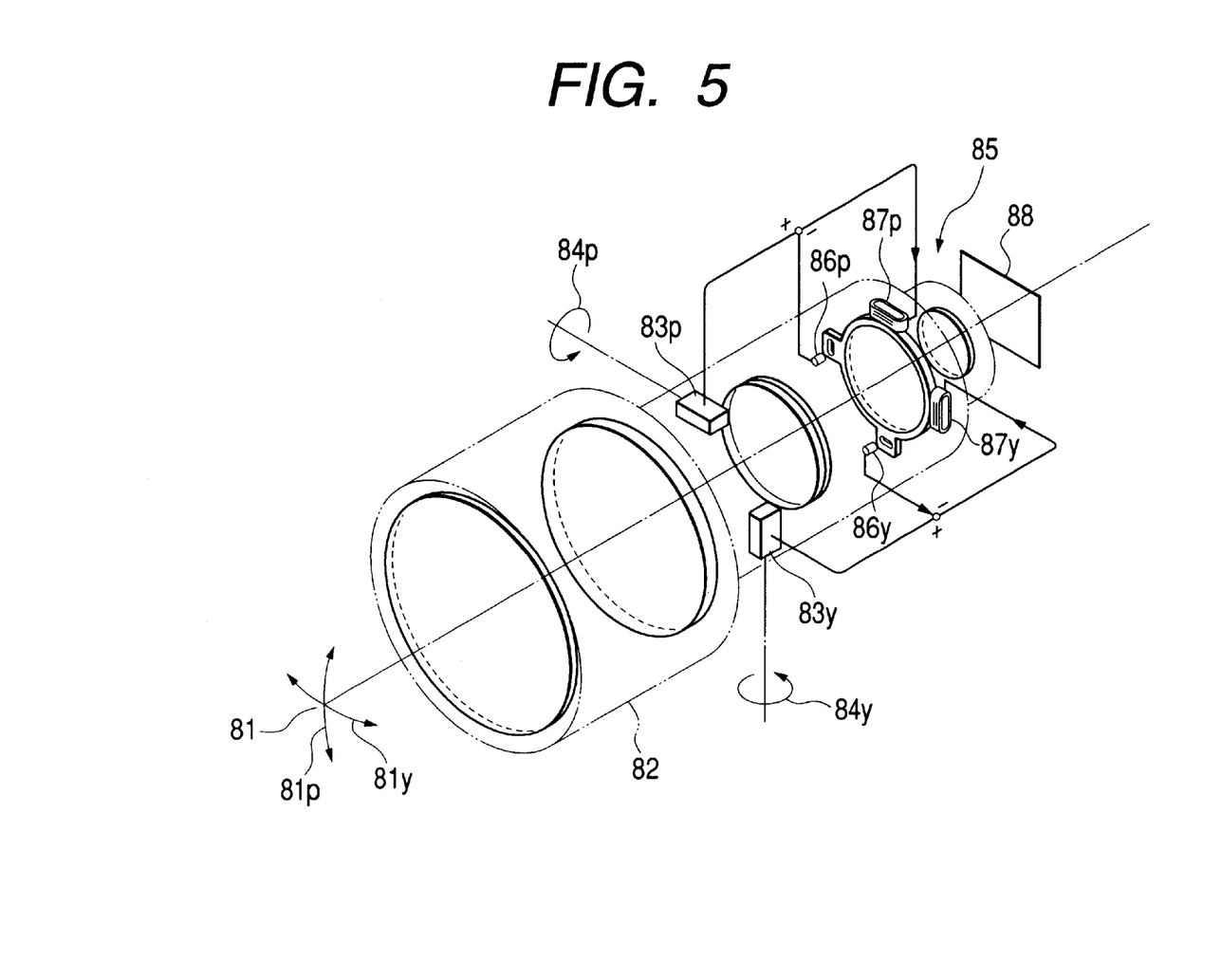
FIG. 5 is a perspective view showing an example of a vibration prevention system for an image blur correction apparatus.

FIG. 5 shows a system for suppressing image blur caused by vertical camera vibration 81p and horizontal camera vibration 81y in the directions indicated by arrows 81. In this case, this system is provided for the exchangeable photographing lens of a single-lens reflex camera.

Referring to FIG. 5, this camera includes a lens barrel 82, vibration sensors 83p and 83y for respectively detecting vertical camera vibration and horizontal camera vibration in vibration detection directions 84p and 84y, and a vibration correction apparatus 85 (having coils 87p and 87y each serving to apply thrust to the vibration correction apparatus 85 and position sensors 86p and 86y for detecting the position of the vibration correction apparatus 85). A position control loop is formed in the vibration correction apparatus 85, which is driven in accordance with a target value based on outputs from the vibration sensors 83p and 83y, thereby ensuring stability of an image surface 88.

In general, a photographer uses a camera in all positions, e.g., upward and downward positions, at the time of photography. Assume that a photographing lens including an image blur correction apparatus made up of a vibration correction apparatus and vibration sensors like those shown in FIG. 5 is mounted in a camera body, and photography is performed. In this case, since a tilt occurs in the optical axis direction due to the weight of the vibration prevention optical element (correction lens), the optical element must be decentered in the optical axis direction by a charge spring or the like.

The friction on the contact surface due to the charged state (i.e., the decentered state) increases to result in a deterioration in the movement of the optical element.

SUMMARY OF THE INVENTION

It is an object of the present invention to provide an image blur correction apparatus which can improve a vibration correction effect by performing drive so as to reduce the influence of a frictional force in driving a correction lens.

In order to achieve the above object, according to the present invention, there is provided a vibration correction apparatus comprising
  a vibration detection unit which detects a vibration,
  a signal processing unit which performs signal processing for a vibration detection signal output from the vibration detection unit,
  a vibration correction unit which corrects an image movement caused by the vibration, on the basis of a drive signal output from the signal processing unit, and
  a controller which controls drive of the vibration correction unit,
  wherein the controller corrects the drive signal from the signal processing unit by using a predetermined correction value corresponding to a drive direction of the vibration correction unit, and controls drive of the vibration correction unit by using the corrected drive signal.

In order to achieve the above object, according to the present invention, there is provided a vibration correction apparatus comprising
  a vibration detection unit which detects a vibration,
  a signal processing unit which performs signal processing for a vibration detection signal output from the vibration detection unit,
  a vibration correction unit which corrects an image movement caused by the vibration, on the basis of a drive signal output from the signal processing unit, and
  a controller which controls drive of the vibration correction unit,
  wherein the controller corrects the drive signal from the signal processing unit by using a predetermined correction value corresponding to a polarity of a vibration detection signal output from the vibration detection unit, and controls drive of the vibration correction unit by using the corrected drive signal.

In order to achieve the above object, according to the present invention, there is provided an interchangeable lens apparatus which is detachably mounted on an image pickup apparatus, comprising
  a vibration detection unit which detects a vibration,
  a signal processing unit which performs signal processing for a vibration detection signal output from the vibration detection unit,
  a vibration correction optical unit which corrects an image movement caused by the vibration, on the basis of a drive signal output from the signal processing unit, the vibration correction optical unit being mounted in a main body of the interchangeable lens apparatus and capable of moving in a direction perpendicular to an optical axis of the interchangeable lens apparatus, and a controller which controls drive of the vibration correction unit, wherein the controller corrects the drive signal from the signal processing unit by using a predetermined correction value corresponding to a drive direction of the vibration correction optical unit, and controls drive of the vibration correction optical unit by using the corrected drive signal.

In order to achieve the above object, according to the present invention, there is provided an interchangeable lens apparatus which is detachably mounted on an image pickup apparatus, comprising a vibration detection unit which detects a vibration, a signal processing unit which performs signal processing for a vibration detection signal output from the vibration detection unit, a vibration correction optical unit which corrects an image movement caused by the vibration, on the basis of a drive signal output from the signal processing unit, the vibration correction optical unit being mounted in a main body of the interchangeable lens apparatus and capable of moving in a direction perpendicular to an optical axis of the interchangeable lens apparatus, and a controller which controls drive of the vibration correction unit, wherein the controller corrects the drive signal from the signal processing unit by using a predetermined correction value corresponding to a polarity of a vibration detection signal output from the vibration detection unit, and controls drive of the vibration correction optical unit by using the corrected drive signal.

In order to achieve the above object, according to the present invention, there is provided an optical apparatus including an interchangeable lens and an image pickup apparatus which allows the interchangeable lens apparatus to be detachably mounted thereon and picks up photography light from the interchangeable lens apparatus, comprising a vibration detection unit which detects a vibration, a signal processing unit which performs signal processing for a vibration detection signal output from the vibration detection unit, a vibration correction optical unit which corrects an image movement caused by the vibration, on the basis of a drive signal output from the signal processing unit, the vibration correction optical unit being mounted in a main body of the interchangeable lens apparatus and capable of moving in a direction perpendicular to an optical axis of the interchangeable lens apparatus, a controller which controls drive of the vibration correction unit, and an image pickup device which picks up photography light from the interchangeable lens apparatus, wherein the controller corrects the drive signal from the signal processing unit by using a predetermined correction value corresponding to a drive direction of the vibration correction optical unit, and controls drive of the vibration correction optical unit by using the corrected drive signal.

In order to achieve the above object, according to the present invention, there is provided an optical apparatus including an interchangeable lens and an image pickup apparatus which allows the interchangeable lens apparatus to be detachably mounted thereon and picks up photography light from the interchangeable lens apparatus, comprising a vibration detection unit which detects a vibration, a signal processing unit which performs signal processing for a vibration detection signal output from the vibration detection unit, a vibration correction optical unit which corrects an image movement caused by the vibration, on the basis of a drive signal output from the signal processing unit, the vibration correction optical unit being mounted in a main body of the interchangeable lens apparatus and capable of moving in a direction perpendicular to an optical axis of the interchangeable lens apparatus, a controller which controls drive of the vibration correction unit, and an image pickup device which picks up photography light from the interchangeable lens apparatus, wherein the controller corrects the drive signal from the signal processing unit by using a predetermined correction value corresponding to a polarity of a vibration detection signal output from the vibration detection unit, and controls drive of the vibration correction optical unit by using the corrected drive signal.

Furthermore, the vibration correction unit may be an optical correction unit including a correction optical device which has an optical axis and is moved in a direction perpendicular to the optical axis.

The controller may correct the drive signal by adding or subtracting a predetermined correction value corresponding to the drive direction of the vibration correction unit to or from the drive signal from the signal processing unit.

The correction value may be one of a plurality of predetermined correction values, and the plurality of correction values may be stored in a memory.

The signal processing unit may include a calculation part which obtains a displacement signal by integrating the vibration detection signal output from the vibration detection unit.

Moreover, the vibration detection signal output from the vibration detection unit is the vibration angular velocity signal, and the signal processing unit may include a calculation part which obtains a displacement signal by integrating the angular velocity signal.

The above and other objects, features, and advantages of the present invention will be apparent from the following detailed description in conjunction with the accompanying drawings and the appended claims.

DESCRIPTION OF THE PREFERRED EMBODIMENT

An embodiment of the present invention will be described in detail with reference to the accompanying drawings.

Figure 1:
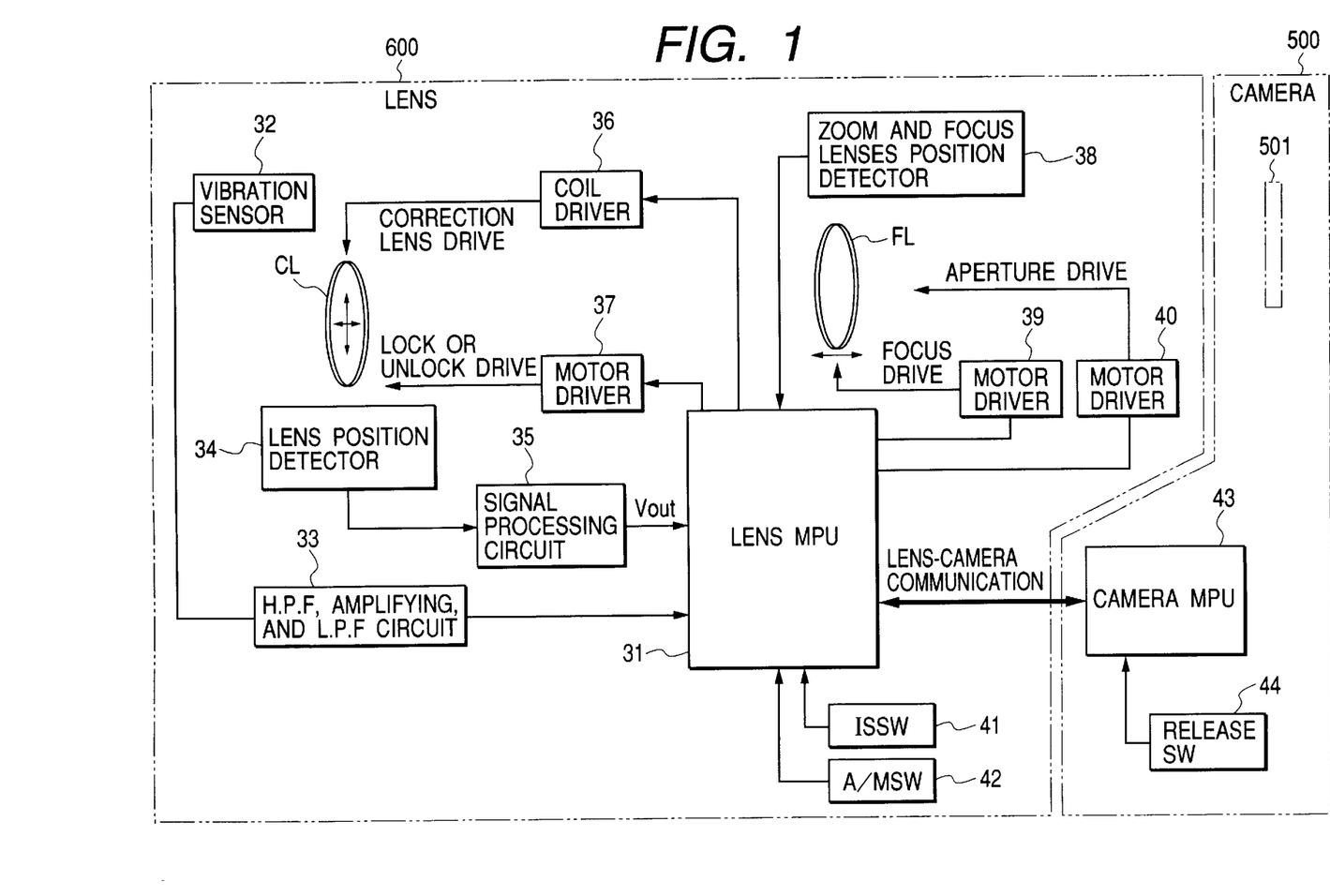
FIG. 1 is a block diagram showing the arrangement of an interchangeable lens for a single-lens reflex camera having an image blur correction function according to an embodiment of the present invention.

FIG. 1 is a block diagram according to an embodiment of the present invention. This embodiment is based on the assumption that an image blur correction function is applied to an interchangeable lens 600 detachably mounted on a camera 500 such as a camera using silver halide films or a camera using an image pickup device, e.g., a CCD. In this case, control is performed to shift a correction lens in accordance with a vibration angular displacement, the driving direction of the correction lens is determined on the basis of the polarity of the vibration velocity (angular velocity signal in the following description) detected by a vibration sensor, and a predetermined value is added/subtracted to/from the drive target signal calculated from the vibration angular displacement in accordance with the driving direction.

Referring to FIG. 1, this embodiment includes the camera 500 and interchangeable lens 600. The camera 500 uses a silver halide film or an image pickup device 501 such as a CCD. A lens MPU 31 performs control on the lens 600 side by communicating with a camera MPU 43. A vibration sensor 32 detects vibrations. A signal from the vibration sensor 32 is subjected to direct current (DC) component cutting, amplification, and noise removal in an H.P.F, amplifying, and L.P.F circuit 33. The resultant signal is input as a vibration signal to the A/D conversion terminal of the lens MPU 31. A lens position detector 34 detects the position of a correction lens CL. The signal detected by the lens position detector 34 is subjected to processing such as filtering in a signal processing circuit 35. The resultant signal is then input as a position detection signal to the A/D conversion input terminal of the lens MPU 31. The vibration signal and position detection signal are used for feedback operation in the lens MPU 31 to obtain a drive signal for driving the correction lens CL. The drive signal is output to a coil driver 36, which drives a voice coil motor (not shown) to perform image blur correction using the correction lens. When no image blur correction is to be performed, the lens MPU 31 outputs a lock signal to a motor driver 37 to drive a lock motor (not shown) so as to lock the correction lens CL. When image blur correction is to be performed, the lens MPU 31 outputs an unlock signal to the motor driver 37 to drive the lock motor (not shown) so as to unlock the correction lens CL.

In addition to the above image blur correction control, the lens MPU 31 drives a focus lens FL and aperture (not shown) through motor drivers 39 and 40 on the basis of an output from a zoom and focus lenses position detector 38 for zoom/focus zone detection.

An operation selection switch (ISSW) 41 is used to choose between performing image blur correction (Image Stabilizer) and not performing it. A switch (A/MSW) 42 is used to choose between the autofocus mode and the manual focus mode.

The lens MPU 31 performs camera/lens communication with the camera MPU 43 to check the statuses (focal length, the states of the switches, and the like) of the camera and lens and communicate drive commands such as a focus drive command and aperture drive command.

In general, a release switch 44 is a two-stroke switch, which is designed to turn on a switch SW1 (not shown) when the release switch 44 is pressed to the first stroke, and a release switch SW2 is turned on when the release switch 44 is pressed to the second stroke. The vibration sensor 32 may be placed on the camera 500 side.

Figure 2:
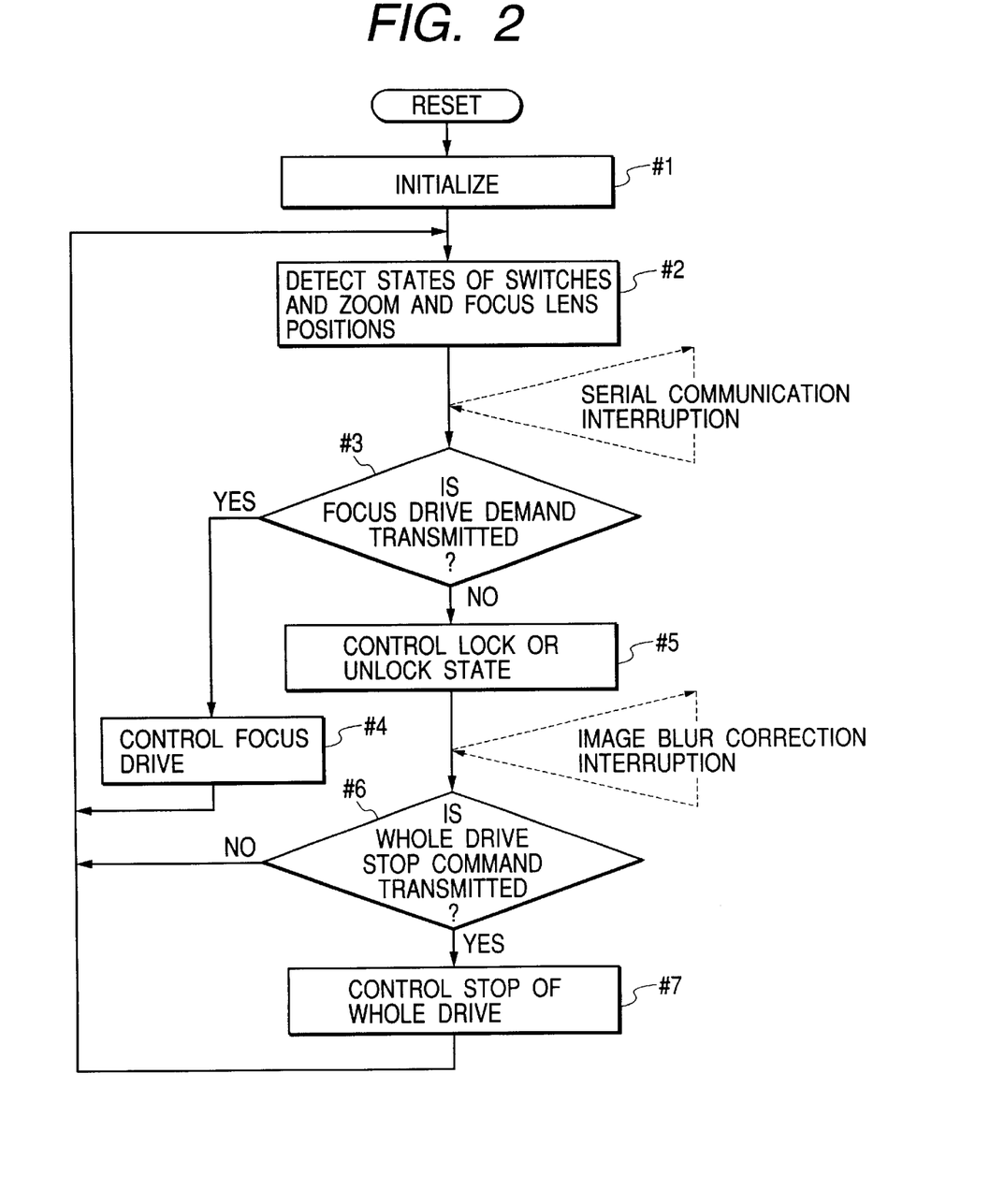
FIG. 2 is a flow chart showing the main operation of a lens MPU in FIG. 1.

The operation of the main part which is performed by the lens MPU 31 will be described next with reference to the flow chart of FIG. 2.

When the interchangeable lens 600 is mounted in the camera 500, serial communication is performed from the camera 500 to the lens 600. This communication is performed through the electric contact (not shown) of an attachment mount (not shown) for the lens 600 and camera 500. The lens MPU 31 starts operation from step #1 in FIG. 2.

In step #1, the lens MPU 31 perform initialization for lens control and image blur correction control. In step #2, the lens MPU 31 detects the states of the switches ISSW and A/MSW and detects the zoom and focus lens positions through the zoom and focus lenses position detector 38. In step #3, the lens MPU 31 checks whether a focus drive demand is transmitted from the camera 500. If YES in step #3, the flow advances to step #4, in which the lens MPU 31 performs focus drive control through the motor driver 39 in accordance with the focus lens drive amount commanded from the camera 500.

If it is determined in step #3 that no focus drive demand is received, the flow advances to step #5 to perform lock/unlock control on the correction lens CL through the motor driver 37 or set an image blur correction start flag IS_START in accordance with communication from the camera 500 and the states of the switch ISSW. In step #6, the lens MPU 31 checks whether a whole drive stop command (to stop the drive of all the actuators in the lens 600) is received from the camera 500. If no operation is performed on the camera 500 side, a whole drive stop command is transmitted from the camera 500 after a while. When the lens MPU 31 receives this command, the flow advances to step #7 to perform whole drive stop control. In this case, the lens MPU 31 stops the drive of all the actuators and set the microcomputer in the sleep (stop) state. In addition, the lens MPU 31 stops supplying power to the image blur correction apparatus (comprised of the vibration sensor 32, correction lens CL, and the like).

Some operation is performed on the camera 500 and communication is performed from the camera MPU 43 to the lens 600 afterward. The lens MPU 31 then cancels the sleep state in accordance with this communication.

If a serial communication interruption demand and image blur correction control interruption demand are received from the camera 500 during these operations, the lens MPU 31 performs the corresponding interruption processing.

In the serial communication interruption processing, the lens MPU 31 decodes communication data and performs lens processing such as aperture drive in accordance with the decoding result. Upon decoding the communication data, the lens MPU 31 can determine the ON state of the switch SW1, the ON state of the switch SW2, a shutter speed, a camera type, and the like.

The image blur correction interruption is a timer interruption that occurs in a predetermined cycle (e.g., 500 µsec). Since pitch-direction (vertical-direction) control and yaw-direction (horizontal-direction) control are alternately performed, the sampling period in one direction becomes 1 msec. In addition, since many parts of control methods in the two directions are identical, a program is created for only one system. Obviously, although the control methods (calculation coefficients and the like) are the same, data such as calculation results in the pitch direction differ from those in the yaw-direction. For this reason, reference addresses are respectively set for a yaw and pitch, and data such as calculation results are designated with indirect addresses in a RAM to switch the reference addresses depending on pitch control and yaw control, thereby performing calculations.

Figure 3:
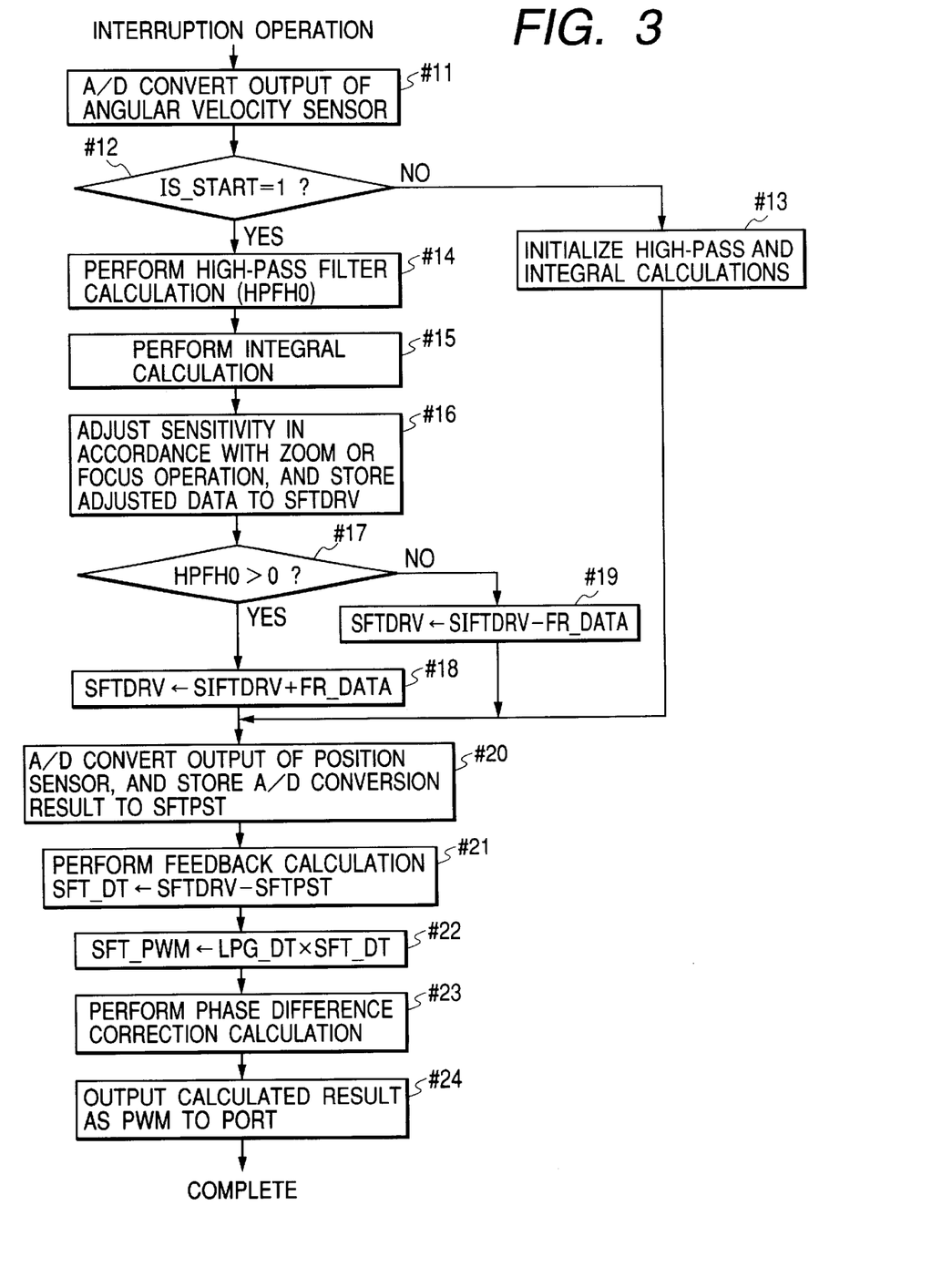
FIG. 3 is a flow chart showing image blur correction control operation according to an embodiment of the present invention.

When an image blur correction interruption occurs during the main operation of the lens 600, the lens MPU 31 starts image blur correction control from step #11 in FIG. 3. The lens MPU 31 obtains a vibration angular velocity signal from the vibration sensor 32, and generates a vibration correction target signal (drive signal) from the vibration angular velocity signal. The lens MPU 31 then performs control to detect the drive direction of the correction lens and correct (add or subtract) the vibration correction target signal as a drive signal with a signal corresponding to a frictional force as a correction value during this image blur correction interruption.

Referring to FIG. 3, in step #11, the lens MPU 31 A/D-converts an output from the angular velocity sensor which is the vibration sensor 32. In step #12, the lens MPU 31 checks the state of the image blur correction flag IS_START. If the image blur correction flag IS_START is cleared, the flow advances to step #13 to initialize high-pass and integral calculations because no image blur correction is performed. The flow then advances to step #20.

If it is determined in step #12 that the image blur correction flag IS_START is set, the flow advances to step #14 to perform a high-pass filter calculation to start image blur correction operation. In this case, time constant switching is performed for 2 to 3 sec after the start of the image blur correction operation to reduce image fluctuations at start-up. The calculation results are stored in the RAM area set by HPFH0 in the lens MPU 31. In step #15, the lens MPU 31 performs an integral calculation. The calculation result becomes angular displacement data θ. If panning is performed, cutoff frequencies for integration are switched in accordance with a vibration angular displacement.

In step #16, since the decentering amount (sensitivity) of the correction lens with respect to the vibration angular displacement changes depending on the zoom and focus lens positions, the decentering amount is adjusted. More specifically, the zoom and focus lens positions are divided into several zones, and an average optical vibration prevention sensitivity (deg/mm) in each zone is read out from table data. Conversion to drive data for the correction lens CL is then performed on the basis of the read optical vibration prevention sensitivity and the above angular displacement data Θ. The calculation result is stored in the RAM area set by SFTDRV in the lens MPU 31.

In step #17, the lens MPU 31 reads out the calculation result (HPFH0) obtained in step #14 and determines the polarity of the vibration angular velocity signal. If the polarity of the vibration angular velocity signal is positive, the flow advances to step #18 to add a predetermined value FR_DATA to STDRV obtained in step #16 to generate new correction lens drive data SFTDRV. If the polarity of the vibration angular velocity signal is negative, the flow advances to step #19 to subtract the predetermined value FR_DATA from SFTDRV obtained in step #16 to generate new correction lens drive data SFTDRV.

The operation in steps #17 to #19 will be described in detail below with reference to FIGS. 4A to 4C.

Figure 4A:
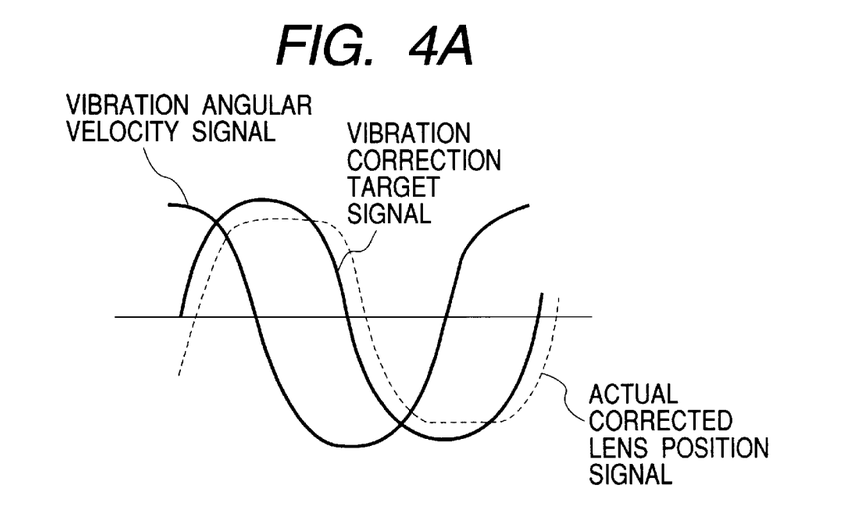
FIGS. 4A, 4B and 4C are graphs for explaining the operation in steps #17 to #19 in FIG. 3.
Figure 4B:
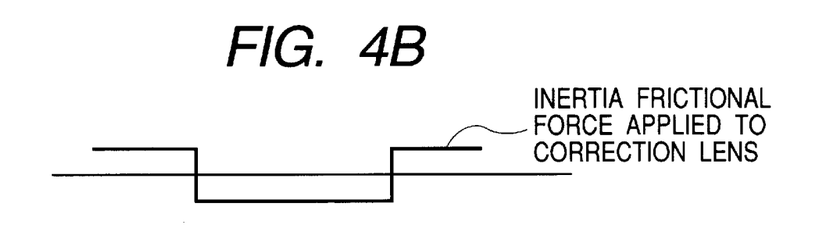
Figure 4C:
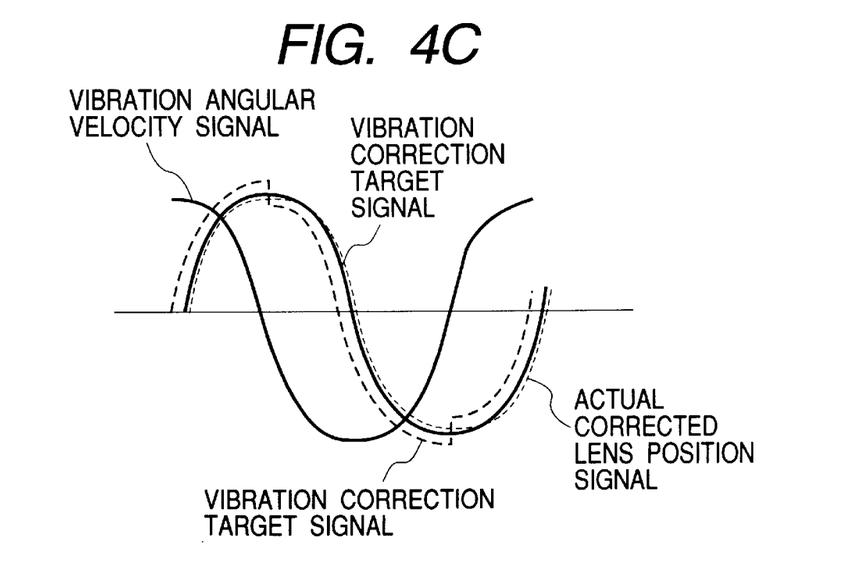

If a frictional force (which is produced when the correction lens is shifted in the optical axis direction by the charge spring or the like) is produced during the drive of the correction lens CL, a difference (error) is produced between a vibration correction target signal as a drive signal and an actual corrected lens position signal, as shown in FIG. 4A. If the drive direction of the correction lens CL changes, the direction in which the inertia frictional force acts is also reversed, as shown in FIG. 4B. The timing at which the drive direction of the correction lens CL is reversed is close to the timing at which the polarity of the vibration angular velocity signal is reversed. If, therefore, the polarity of the vibration angular velocity signal is determined, and a vibration correction target correction signal is generated by adding data corresponding to the inertia frictional force, which is a correction value, to the vibration correction target signal, as shown in FIG. 4C, the correction lens is driven to correct the error caused by the frictional force, thereby reducing the difference between the actual corrected lens position signal and the vibration correction target signal.

A plurality of values are prepared as predetermined values FR_DATA as correction values corresponding to inertia frictional forces, and these correction values may be stored in a ROM or a programmable nonvolatile memory such as an EEPROM. In addition, a ROM or EEPROM may be mounted on the camera 500 side or lens 600 side or may be mounted in the lens MPU 31 or camera MPU 43.

Referring back to FIG. 3, in step #20, the lens MPU 31 AID-converts a position sensor output (an output from the lens position detector 34) associated with the correction lens CL, and stores the result in the RAM area set with SFTPST in the lens MPU 31. In step #21, the lens MPU 31 performs a feedback calculation (SFTDRV-SFTPST). In step #22, the lens MPU 31 multiples a loop gain (LPG_DT) and the calculation result (SFT_DT) obtained in step #21. In step #23, the lens MPU 31 performs a phase difference correction calculation to make the control system stable. In step #24, the lens MPU 31 outputs the result obtained in step #23 as a pulse width modulation signal PWM to the port of the lens MPU 31, thus completing the interruption. The PWM signal is then input to the coil driver 36, and the correction lens CL is driven by a voice coil motor (not shown), thereby performing image blur correction.

As described above, according to the above embodiment, in steps #17 to #19 in FIG. 3, a vibration correction drive signal is corrected by a correction value in accordance with the drive direction of the correction lens CL and the polarity of a vibration angular velocity signal. This makes it possible to reduce the error caused by an inertia frictional force and improve the vibration correction effect.

The above embodiment has exemplified the case where vibration correction is performed by position feedback control. However, the present invention can also be applied to velocity feedback system or open control which does not use the correction lens position sensor.

In addition, in the above embodiment, the correction lens is driven by the voice coil motor. However, the correction lens may be driven by a DC motor or other types of actuators.

The above embodiment has exemplified the case where the image blur correction apparatus is incorporated in the interchangeable lens. However, the image blur correction apparatus may not be mounted in the interchangeable lens but may be mounted as an accessory in a conversion lens or the like to be mounted in front of the interchangeable lens. This embodiment has exemplified the camera. However, the present invention can be equally applied to other optical devices such as a video camera using an image pickup device such as a CCD and a camera without any interchangeable lens, such as a digital still camera as long as they have image blur correction functions.

In addition, as the vibration sensor, an angular velocity sensor is used. However, an angular acceleration sensor, acceleration sensor, velocity sensor, angular displacement sensor, or displacement sensor may be used. Alternatively, for example, a method of directly detecting image blur itself may be used. That is, any sensor or method that can detect vibrations can be used.

As has been described above, according to the above embodiment, there is provided an image blur correction apparatus which can improve a vibration correction effect by reducing the influence of a frictional force in driving the correction lens.

What is claimed is:

1. A vibration correction apparatus comprising:
   a vibration detection unit which detects a vibration;
   a signal processing unit which performs signal processing of a vibration detection signal output from said vibration detection unit;
   a vibration correction unit which corrects image movement caused by the vibration, on the basis of a drive signal output from said signal processing unit; and
   a controller which controls drive of said vibration correction unit,
   wherein said controller corrects the drive signal from said signal processing unit using a predetermined correction value corresponding to a drive direction of said vibration correction unit, and controls drive of said vibration correction unit using the corrected drive signal.

2. An apparatus according to claim 1, wherein said vibration correction unit is an optical correction unit including a correction optical device which has an optical axis and is moved in a direction perpendicular to the optical axis.

3. An apparatus according to claim 1, wherein said controller corrects the drive signal by adding or subtracting a predetermined correction value corresponding to the drive direction of said vibration correction unit to or from the drive signal output from said signal processing unit.

4. An apparatus according to claim 1, wherein the correction value is one of a plurality of predetermined correction values, and the plurality of correction values are stored in a memory.

5. An apparatus according to claim 1, wherein said signal processing unit includes a calculation part which obtains a displacement signal by integrating the vibration detection signal output from said vibration detection unit.

6. A vibration correction apparatus comprising:
   a vibration detection unit which detects vibration;
   a signal processing unit which performs signal processing of a vibration detection signal output from said vibration detection unit;
   a vibration correction unit which corrects image movement caused by the vibration, on the basis of a drive signal output from said signal processing unit; and
   a controller which controls drive of said vibration correction unit,
   wherein said controller corrects the drive signal from said signal processing unit using a predetermined correction value corresponding to a polarity of a vibration detection signal output from said vibration detection unit, and controls drive of said vibration correction unit using the corrected drive signal.

7. An apparatus according to claim 6, wherein said vibration correction unit is an optical correction unit including a correction optical device which has an optical axis and is moved in a direction perpendicular to the optical axis.

8. An apparatus according to claim 6, wherein said controller corrects the drive signal by adding or subtracting a predetermined correction value corresponding to the drive direction of said vibration correction unit to or from the drive signal output from said signal processing unit.

9. An apparatus according to claim 6, wherein the correction value is one of a plurality of predetermined correction values, and the plurality of correction values are stored in a memory.

10. An apparatus according to claim 6, wherein the vibration detection signal output from said vibration detection unit is the vibration angular velocity signal, and said signal processing unit includes a calculation part which obtains a displacement signal by integrating the angular velocity signal.

11. An interchangeable lens apparatus which is detachably mounted on an image pickup apparatus, comprising:
    a vibration detection unit which detects vibration;
    a signal processing unit which performs signal processing of a vibration detection signal output from said vibration detection unit;
    a vibration correction optical unit which corrects image movement caused by the vibration, on the basis of a drive signal output from said signal processing unit, said vibration correction optical unit being mounted in a main body of the interchangeable lens apparatus and capable of moving in a direction perpendicular to an optical axis of the interchangeable lens apparatus; and
    a controller which controls drive of said vibration correction optical unit,
    wherein said controller corrects the drive signal from said signal processing unit using a predetermined correction value corresponding to a drive direction of said vibration correction optical unit, and controls drive of said vibration correction optical unit using the corrected drive signal.

12. An apparatus according to claim 11, wherein said vibration correction optical unit is an optical correction unit including a correction optical device which has an optical axis and is moved in a direction perpendicular to the optical axis.

13. An apparatus according to claim 11, wherein said controller corrects the drive signal by adding or subtracting a predetermined correction value corresponding to the drive direction of said vibration correction optical unit to or from the drive signal output from said signal output processing unit.

14. An apparatus according to claim 11, wherein the correction value is one of a plurality of predetermined correction values, and the plurality of correction values are stored in a memory.

15. An apparatus according to claim 11, wherein said signal processing unit includes a calculation part which obtains a displacement signal by integrating the vibration detection signal output from said vibration detection unit.

16. An interchangeable lens apparatus which is detachably mounted on an image pickup apparatus, comprising:
    a vibration detection unit which detects vibration;
    a signal processing unit which performs signal processing of a vibration detection signal output from said vibration detection unit;
    a vibration correction optical unit which corrects image movement caused by the vibration, on the basis of a drive signal output from said signal processing unit, said vibration correction optical unit being mounted in a main body of the interchangeable lens apparatus and capable of moving in a direction perpendicular to an optical axis of the interchangeable lens apparatus; and
    a controller which controls drive of said vibration correction optical unit,
    wherein said controller corrects the drive signal from said signal processing unit using a predetermined correction value corresponding to a polarity of a vibration detection signal output from said vibration detection unit, and controls drive of said vibration correction optical unit using the corrected drive signal.

17. An apparatus according to claim 16, wherein said vibration correction optical unit is an optical correction unit including a correction optical device which has an optical axis and is moved in a direction perpendicular to the optical axis.

18. An apparatus according to claim 16, wherein said controller corrects the drive signal by adding or subtracting a predetermined correction value corresponding to the drive direction of said vibration correction optical unit to or from the drive signal output from said signal output processing unit.

19. An apparatus according to claim 16, wherein the correction value is one of a plurality of predetermined correction values, and the plurality of correction values are stored in a memory.

20. An apparatus according to claim 16, wherein said signal processing unit includes a calculation part which obtains a displacement signal by integrating the vibration detection signal output from said vibration detection unit.

21. An optical apparatus including an interchangeable lens and an image pickup apparatus which allows the interchangeable lens apparatus to be detachably mounted thereon and picks up photography light from the interchangeable lens apparatus, comprising:

a vibration detection unit which detects vibration;

a signal processing unit which performs signal processing of a vibration detection signal output from said vibration detection unit;

a vibration correction optical unit which corrects image movement caused by the vibration, on the basis of a drive signal output from said signal processing unit, said vibration correction optical unit being mounted in a main body of the interchangeable lens apparatus and capable of moving in a direction perpendicular to an optical axis of the interchangeable lens apparatus;

a controller which controls drive of said vibration correction optical unit; and an image pickup device which picks up photography light from the interchangeable lens apparatus, wherein said controller corrects the drive signal from said signal processing unit using a predetermined correction value corresponding to a drive direction of said vibration correction optical unit, and controls drive of said vibration correction optical unit using the corrected drive signal.

22. An apparatus according to claim 21, wherein said vibration correction optical unit is an optical correction unit including a correction optical device which has an optical axis and is moved in a direction perpendicular to the optical axis.

23. An apparatus according to claim 21, wherein said controller corrects the drive signal by adding or subtracting a predetermined correction value corresponding to the drive direction of said vibration correction unit to or from the drive signal output from said signal output processing unit.

24. An apparatus according to claim 21, wherein the correction value is one of a plurality of predetermined correction values, and the plurality of correction values are stored in a memory.

25. An apparatus according to claim 21, wherein said signal processing unit includes a calculation part which obtains a displacement signal by integrating the vibration detection signal output from said vibration detection unit.

26. An optical apparatus including an interchangeable lens and an image pickup apparatus which allows the interchangeable lens apparatus to be detachably mounted thereon and picks up photography light from the interchangeable lens apparatus, comprising:

a vibration detection unit which detects vibration;

a signal processing unit which performs signal processing of a vibration detection signal output from said vibration detection unit;

a vibration correction optical unit which corrects image movement caused by the vibration, on the basis of a drive signal output from said signal processing unit, said vibration correction optical unit being mounted in a main body of said interchangeable lens apparatus and capable of moving in a direction perpendicular to an optical axis of said interchangeable lens apparatus;

a controller which controls drive of said vibration correction optical unit; and an image pickup device which picks up photography light from the interchangeable lens apparatus, wherein said controller corrects the drive signal from said signal processing unit using a predetermined correction value corresponding to a polarity of a vibration detection signal output from said vibration detection unit, and controls drive of said vibration correction optical unit using the corrected drive signal.

27. An apparatus according to claim 26, wherein said vibration correction optical unit is an optical correction unit including a correction optical device which has an optical axis and is moved in a direction perpendicular to the optical axis.

28. An apparatus according to claim 26, wherein said controller corrects the drive signal by adding or subtracting a predetermined correction value corresponding to the drive direction of said vibration correction unit to or from the drive signal output from said signal output processing unit.

29. An apparatus according to claim 26, wherein the correction value is one of a plurality of predetermined correction values, and the plurality of correction values are stored in a memory.

30. An apparatus according to claim 26, wherein said signal processing unit includes a calculation part which obtains a displacement signal by integrating the vibration detection signal output from said vibration detection unit.

31. An optical apparatus for picking up an image formed by an image pick up optical system, comprising:

a vibration correction optical unit which corrects image movement caused by vibration;

a position detection unit which detects a position of said vibration correction optical unit;

a sensor which detects the vibration; and a controller which controls drive of said vibration correction optical unit in accordance with outputs of said position detection unit and said sensor, wherein said controller corrects the drive of said vibration correction optical unit in accordance with a correction value corresponding to a drive direction of said vibration correction optical unit.

32. An exchangeable lens detachably attachable to a camera, comprising:

a vibration correction optical unit which corrects image movement caused by vibration;

a position detection unit which detects a position of said vibration correction optical unit;

a sensor which detects the vibration; and a controller which controls drive of said vibration correction optical unit in accordance with outputs of said position detection unit and said sensor, wherein said controller corrects the drive of said vibration correction optical unit in accordance with a correction value corresponding to a drive direction of said vibration correction optical unit.

33. A camera system including an exchangeable lens and a camera to which said exchangeable lens is detachably attached, said camera system comprising:

a vibration correction optical unit which corrects image movement caused by vibration;

a position detection unit which detects a position of said vibration correction optical unit;

a sensor which detects the vibration; and a controller which controls drive of said vibration correction optical unit in accordance with outputs of said position detection unit and said sensor, wherein said controller corrects the drive of said vibration correction optical unit in accordance with a correction value corresponding to a drive direction of said vibration correction optical unit.

* * * * *

UNITED STATES PATENT AND TRADEMARK OFFICE
CERTIFICATE OF CORRECTION

PATENT NO. : 6,735,383 B2
DATED : May 11, 2004
INVENTOR(S) : Shinji Imada

It is certified that error appears in the above-identified patent and that said Letters Patent is hereby corrected as shown below:

<u>Column 6,</u>
Line 8, "perform" should read -- performs --.

<u>Column 7,</u>
Line 43, "data Θ." should read -- data θ. --

<u>Column 8,</u>
Line 20, "AID-converts" should read -- A/D-converts --.

<u>Column 9,</u>
Line 11, "detects a" should read -- detects --.

Signed and Sealed this

Twenty-fourth Day of August, 2004

JON W. DUDAS
*Director of the United States Patent and Trademark Office*